United States Patent [19]

Schumacher, Jr. et al.

[11] 3,847,234

[45] Nov. 12, 1974

[54] PRESSURE RELIEF DEVICE FOR DRILL BIT LUBRICATION SYSTEM

[75] Inventors: Percy W. Schumacher, Jr.; Henry W. Murdoch, both of Houston, Tex.

[73] Assignee: Reed Tool Comapny, Houston, Tex.

[22] Filed: Feb. 7, 1973

[21] Appl. No.: 330,412

Related U.S. Application Data

[63] Continuation-in-part of Ser. No. 258,516, June 1, 1972, abandoned.

[52] U.S. Cl. .................................. 175/228, 308/8.2
[51] Int. Cl. ......... E21b 9/08, E21b 9/18, E21b 9/28
[58] Field of Search ...... 137/493; 308/8.2; 184/6 R, 184/7 R, 39; 175/227, 228, 371, 372, 99

[56] References Cited
UNITED STATES PATENTS

| | | | |
|---|---|---|---|
| 2,906,504 | 9/1959 | Parks | 175/228 |
| 2,941,544 | 6/1960 | Peras | 137/525 |
| 3,230,019 | 11/1966 | Kotch et al. | 308/8.2 |
| 3,463,270 | 8/1969 | Lundstrom et al. | 175/228 X |
| 3,476,195 | 11/1969 | Galle | 175/228 |
| 3,721,306 | 3/1973 | Sartor | 175/228 |
| 3,735,825 | 5/1973 | Keller | 175/228 |
| 3,739,864 | 7/1973 | Cason et al. | 175/228 |
| 3,744,580 | 7/1973 | Crow | 175/228 |
| 3,765,495 | 10/1973 | Murdoch et al. | 175/371 |

*Primary Examiner*—Geo. V. Larkin
*Attorney, Agent, or Firm*—Jack R. Springgate; Joe E. Edwards; M. H. Gay

[57] ABSTRACT

A pressure relief device used in a drill bit lubrication system having a flexible membrane defining the outer portion of such lubrication system in a vent passage through the body of the drill bit with the flexible membrane including a puncture or other opening therethrough which seals the lubrication system at all pressure differentials below a pre-selected pressure differential and at such pre-selected pressure differential opens to relieve the pressure differential. The pressure relief device may be constructed to function in both directions, i.e., to relieve both excess pressure within the lubrication system and to relieve against excess external pressures, with the pre-selected relieving pressure differentials being the same or different in opposite directions. This abstract is neither intended to define the invention of the application which, of course, is measured by the claims, nor is it intended to be limiting as to the scope of the invention in any way.

11 Claims, 6 Drawing Figures

PATENTED NOV 12 1974

PRESSURE RELIEF DEVICE FOR DRILL BIT LUBRICATION SYSTEM

CROSS REFERENCE TO RELATED APPLICATION

This application is a continuation-in-part of our prior copending application Ser. No. 258,516, filed June 1, 1972 now abandoned.

BACKGROUND OF THE INVENTION

It has been noticed that the failure of drill bits at times has resulted from the failure of the lubrication system to withstand pressure differentials and the resulting failure of the cutter bearings. Compensators in the form of flexible diaphragms have been provided to assure that the bore hole pressure exerted on the cutter seals is equalized by subjecting the lubrication system to the bore hole pressure and thereby prolonging the life of the seals. Such compensators have failed to protect against the buildup of excess pressure differential between the lubrication system and bore hole fluids and have ruptured thus limiting the life of the cutter.

In removing a drill bit from a deep well bore, the excess pressures to which it has been exposed at the bottom of the well bore are sometimes trapped within the lubrication system and cause rupture of the compensator and damage to the seals, thus preventing further use of the drill bit.

Also, when the compensator has completely extended into the grease reservoir, a condition which may be caused by a slow leakage of grease from the system, the pressure within the lubrication system may fluctuate to a lower pressure than the external pressure. This condition can cause seal damage from too high a pressure differential and can cause rupture of the diaphragm compensator.

It is believed that rupture of the compensator leads to such rapid and premature failure of the drill bit that some protection against excessive pressure differential conditions extends the useful life of the drill bit even though such protection is in the form of pressure relief allowing venting from and bleeding into the lubrication system. Such venting and bleeding may result in minor contamination of the lubrication system but would not cause the rapid and premature failure which would be caused by a compensator rupture which permanently opens the lubrication system to the fluids and solids in the well bore.

SUMMARY

The present invention relates to an improved pressure relief device for a drill bit lubrication system.

An object of the present invention is to provide an improved drill bit which has a longer useful life when exposed to high pressures and to removal from the well bore.

Another object is to provide an improved pressure relief valve device for the lubrication system of a drill bit which prevents damage to the compensator and thereby extending the life of the drill bit.

A further object is to provide an improved relief valve device for the lubrication system of a drill bit to relieve excess pressure differentials to the extent necessary to protect the useful life of the drill bit.

BRIEF DESCRIPTION OF THE DRAWINGS

These and other objects and advantages of the present invention are hereinafter more fully explained and disclosed with reference to the drawings wherein.

DESCRIPTION OF THE PREFERRED EMBODIMENTS

Figures 1, 4, 6:
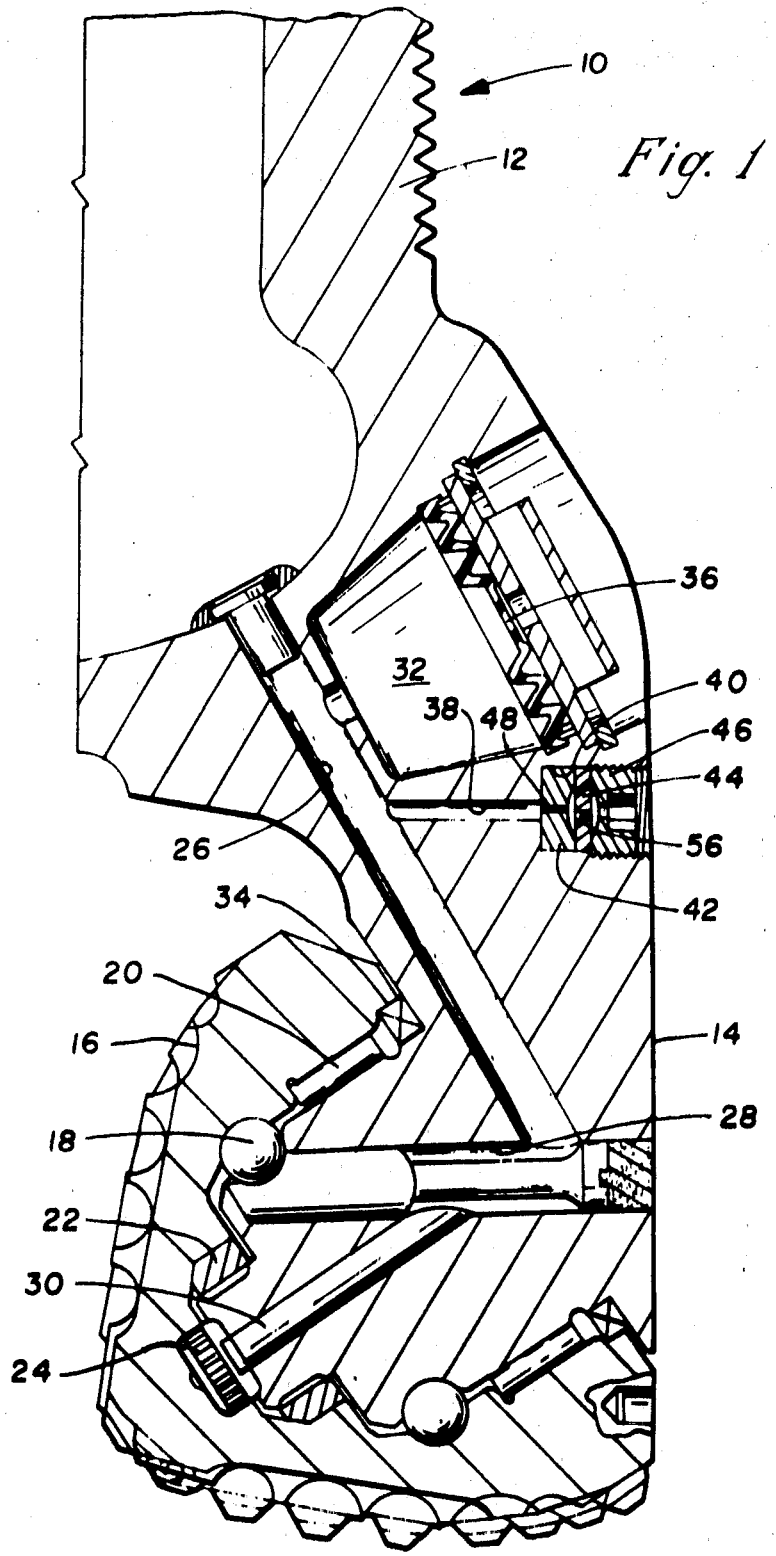
FIG. 1 is a vertical sectional view through one leg of a drill bit having a conical cutter thereon and illustrating the preferred form of improved relief device of the present invention.
FIG. 4 is a sectional view of a modified form of relief diaphragm of the present invention.
FIG. 6 is a partial sectional view of still another modified form of relief diaphragm of the present invention.

The drill bit 10 of the present invention includes the body 12 which normally will have three legs 14 (only one of the legs 14 being illustrated in the drawings) extending downwardly from the body 12 and a roller cutter 16 mounted on each leg 14 with suitable bearings 18 and 20 and suitable bushing 22 and thrust button 24. The drill bit 10 is provided with the lubrication system which includes the passages 26, 28 and 30, and the reservoir 32 and the seal 34. Seal 34 provides a seal between the rotating cutter 16 and the leg 14 of the drill bit 10 so that drilling fluid and other deleterious material is not forced into the bearings and bushings when the drill bit is in use. The outer portion of the reservoir is covered by the compensator diaphragm 36 which is suitably mounted therein to allow external pressure to be exerted on the diaphragm 36 which pressure causes the lubrication system to be at substantially the same pressure as the pressure on the exterior of the drill bit thereby equalizing pressure on the seal 34 which results in an extension of the seal life.

As hereinbefore stated, the compensator diaphragm 36 functions to maintain a relatively small pressure differential across the seal 34 and to allow for changes in volume therein. There are occasions when such diaphragm does not properly control excess pressure differentials and therefore the improved relieving device of the present invention is positioned in the leg 14 in communication with the lubrication system.

Figure 2:
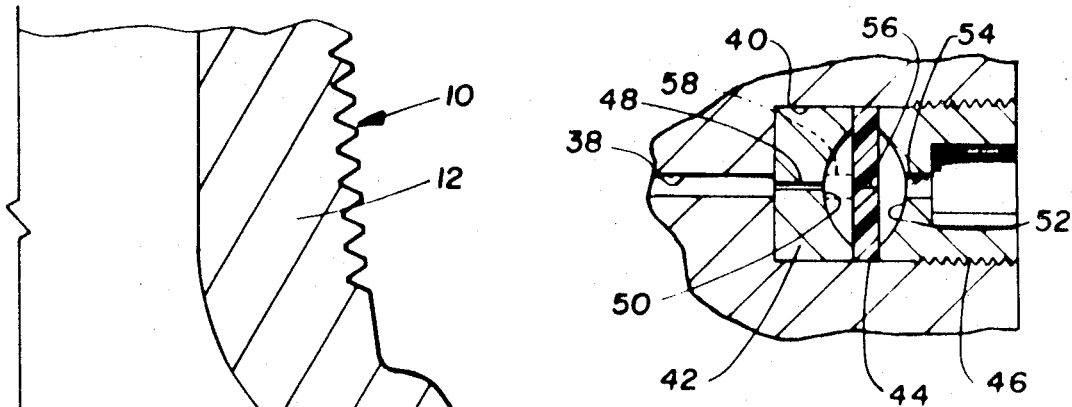
FIG. 2 is an enlarged partial sectional view to disclose the full details of the improved relief device as shown in FIG. 1.

As best seen in FIG. 2, the passageway 38 is in communication with the passageway 26 and extends to the recess 40 in the leg 14 which is open to the exterior of the leg.

The control insert 42 is positioned within the bottom of the recess 40 and the relieving diaphragm 44 is held against the outer facing surface of the insert 42 by the retainer 46 which is threaded into the outer portion of the recess 40. As shown, the insert 42 defines an orifice 48 in communication with the passageway 38 and extending through insert 42 to communicate with the inner side of the relieving diaphragm 44. The outwardly facing side of insert 42 defines a dish-shaped recess 50.

As shown in dashed lines, the unsupported diameter of the diaphragm 44 may be varied in size by varying the diameter of recess 50. Such variable diameter can be used to control the relieving pressure at which the pressure control diaphragm 44 relieves inwardly. The retainer 46 is also provided with a dish-shaped recess 52 and a passageway 54 extending through retainer 46 to be in communication with the exterior of the drill bit 10.

The diaphragm 44 is preferably a resilient material, such as Buna N or Neoprene having a 70 durometer hardness. Diaphragm 44 as shown by the line 56 in FIG. 2, has been punctured as hereinafter described so that when it is exposed to sufficient pressure differential thereacross, it opens to allow relieving of pressure differentials.

The puncture 56 is accomplished by passing a relatively sharp implement such as a needle therethrough without the removal of any material therefrom. While the puncture by a needle is the preferred form of creating the pressure relief diaphragm of the present invention, it is believed that such relief can be accomplished in other ways such as by puncturing the diaphragm with a sharp knife having suitable dimensions.

The variables which affect the pressure differential at which the diaphragm puncture 56 opens to relieve pressure include the type of material used in the diaphragm, the character of the puncture of the diaphragm, the thickness of the diaphragm at the slot, and the effective area allowing free movement of the diaphragm. From this it can be seen that two simple ways of controlling relieving pressure are to control the diaphragm thickness and to control the area of the diaphragm which is free to move responsive to pressure differentials while maintaining the diaphragm material and the character and type of puncture fairly constant. The effective area of the diaphragm 44 is defined by the recesses 50 and 52. The diaphragm 44 is free to flex within the circular area inside of the annular contact of insert 42 and retainer 46 with the outer portion of the diaphragm 44. One simple, easy manner in which the relieving pressure can be changed is to change the free area of the diaphragm as by providing a counter bore 58 in insert 42 as shown in dashed lines in FIG. 2. Such structure greatly reduces the effective free area of the diaphragm and thereby greatly increases the pressure at which the diaphragm relieves. As seen from this figure, if the inner side of the diaphragm is exposed to a much smaller free area than the outer side, the relieving pressure differentials in the two directions are substantially different.

Figure 3:
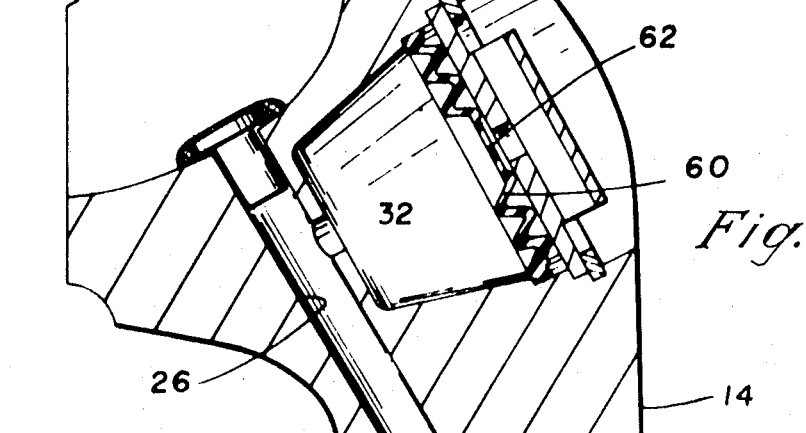
FIG. 3 is another sectional view of the leg of a drill bit illustrating the improved relief device of the present invention being combined with the lubrication system compensator.

In the form of the invention illustrated in FIG. 3, parts being similar to parts shown in FIG. 1 and previously discussed are assigned the same numeral, it being understood that the only change between the two forms of the invention is the change in the pressure relief device. In the drill bit 10 of FIG. 3, the separate pressure relief device has been omitted and the compensator diaphragm 60 has been modified to provide the pressure relieving function for the lubrication system.

The diaphragm 60 is substantially the same as the diaphragm 36 of FIG. 1 except that it is provided with the central puncture 62 which provides the opening through which pressure is relieved when the diaphragm is sufficiently extended to allow such puncture to open responsive to the preselected pressure differentials. As previously described the puncture 62 in the diaphragm 60 is preferably made without removing any material therefrom in order to allow the diaphragm to retain as high pressure as is desired before it relieves.

In some forms of the invention, it is believed applicable to utilize a form relieving diaphragm such as diaphragm compensator 62 or the diaphragm 64 illustrated in FIG. 4. Diaphragm 64 has an outer annular thickened portion 66 with the central thin portion 68. The puncture 70 extends through the diaphragm 64 in the thinnest portion thereof. This outer annular thickened portion defines the free area of the diaphragm 64 and thus provides the necessary room for flexing the diaphragm sufficiently to relieve pressure without having to recess the retainer and insert holding the diaphragm 64. The compensator diaphragm 62, if it is molded, can also be provided with a thinner central portion to allow the diaphragm to flex at a preselected diameter and thereby determine its relieving pressure at least partially by its specific configuration.

Figure 5:
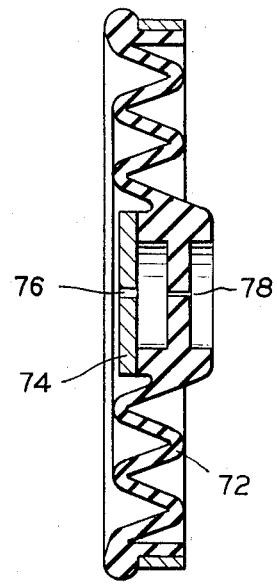
FIG. 5 is a sectional view of another modified form of relief diaphragm of the present invention.

In using such compensator diaphragms as the relief diaphragm it is desirable to provide in combination therewith a means for restricting the flow rate through the relieving perforation such as a central orifice shown with compensator diaphragm 72 in FIG. 5. The plate 74 is secured by suitable bonding (such as by an epoxy cement) to the inner side of the diaphragm 72 and includes an orifice 76 defined therein which is sized to restrict the flow through the diaphragm perforation 78 to a flow rate which assures that the diaphragm 72 is protected from tearing or otherwise being damaged by excess flows.

It may at times be desired to further protect a compensator diaphragm by providing a flow restriction on both sides thereof such as is shown in FIG. 6. The compensator diaphragm 80 has its perforation 82 protected by the inner plate 84 defining the orifice 86 therein and the outer plate 88 defining the orifice 90 therein. The plates 84 and 88 are suitably bonded to the diaphragm 80 such as with an epoxy cement.

Such orifice plates protect the compensator diaphragm from damage but do not change the pressure at which the diaphragm perforation opens to relieve pressure differentials.

In operation, the improved pressure relieving device of the present invention functions to provide a relief from excess pressure differentials to which the lubrication system is exposed. In both forms of the invention, a punctured diaphragm is provided to allow pressure relief between the lubrication system and the exterior of the drill bit. Generally it will be preferred to have a lower pressure relieving point for pressure differentials that are higher within the lubrication system than for those pressure differentials that are higher externally of the lubrication system.

During drilling, rotation of the conical cutter 16 causes slight movement thereof with respect to the leg 14 and possibly causes variations or fluctuations in the volume of the lubrication system which are transmitted to the reservoir 32 and the diaphragm 36 allowing the diaphragm 36 to move and compensate for such changes in volume. In the form of the invention illustrated in FIG. 1, it is desired to protect the pressure relieving diaphragm 44 from such surges or vibrational changes in volume of the lubrication system. The orifice 48 has been provided in the insert 42 and is of such a reduced diameter that such transient fluctuations in the system pressure are not completely transmitted therethrough to the diaphragm 44. The orifice 48 thereby protects the diaphragm 44 from such transient conditions.

Whenever it is desired to reduce the pressure differential at which the pressure relieving device opens in either direction, it is only necessary to either change the thickness of the diaphragm or to change the effective area of the diaphragm as previously explained. In some circumstances, it might be desirable to change the size of the needle with which the puncture 56 is made since the larger needle allows a reduced preselected pressure differential at which the diaphragm opens to provide pressure relief as compared to a smaller needle.

What is claimed is:

1. A drill bit, comprising
a body,
at least one leg depending from said body,
a rotary cutter,
bearing means rotatably mounting said cutter on said leg,
a lubrication reservoir defined in said leg,
means communicating from said reservoir to said bearing means to form a lubrication system,
a compensator diaphragm in communication with said lubrication system,
said compensator diaphragm being exposed to said lubrication system on one side and to the exterior of said leg on the other side to equalize the pressure within said lubrication system with exterior pressure whereby pressure differentials between said lubrication system and the exterior of said leg are minimized, and
normally closed means for relieving response to pressure differentials, excess pressure in said lubrication system to the exterior and excess exterior pressure into said lubrication system.

2. A drill bit according to claim 1 wherein said normally closed relieving means comprises
a relief diaphragm having a puncture therethrough being positioned in a vent passage in said leg with one side thereof being in communication with said lubrication system and the other side thereof and being exposed to the exterior of said leg.

3. A drill bit according to claim 2, including
a recess defined in the exterior of said leg at the outer end of said vent passage, and
a retainer mounted in said recess in engagement with said diaphragm to retain said diaphragm therein.

4. A drill bit according to claim 3, wherein
said retainer has a concave inner surface and an annular diaphragm engaging surface for defining the effective flexing area of said diaphragm for relief to the exterior of the drill bit.

5. A drill bit according to claim 1 wherein said normally closed relieving means comprises
a puncture through said compensator diaphragm.

6. A drill bit according to claim 5 wherein
said puncture opens to relieve pressure as said compensator diaphragm nears the end of its travel whereby said compensator diaphragm is protected from excess pressure differentials.

7. A drill bit according to claim 5 including
a disc secured to said compensator diaphragm in spaced relationship to the portion of said diaphragm through which said puncture extends,
said disc defining a flow restricting orifice to limit the flow through said puncture whereby damage to said compensator diaphragm is prevented.

8. A drill bit according to claim 7 including
a second disc secured to the opposite side of said compensator diaphragm in spaced relation to the portion of said diaphragm through which said puncture extends,
said second disc defining a flow restricting orifice to limit the flow through said puncture.

9. A drill bit, comprising
a body,
at least one leg depending from said body,
a rotary cutter,
bearing means rotatably mounting said cutter on said leg,
a lubrication reservoir defined in said leg,
means communicating from said reservoir to said bearing means to form a lubrication system,
means sealing between said cutter and said leg, and a pressure relief diaphragm mounted in said leg between said lubrication system and the exterior of said leg,
said pressure relief diaphragm having a puncture therethrough,
said pressure relief diaphragm having a thickness, a puncture size and a free diameter whereby it is responsive to preselected pressure differentials to which it is exposed to vent excess system pressure from said system and to bleed excess external pressure into said system.

10. A drill bit, comprising
a body,
at least one leg depending from said body,
a rotary cutter,
bearing means rotatably mounting said cutter on said leg,
a lubrication reservoir defined in said leg,
means communicating from said reservoir to said bearing means to define a lubrication system,
means sealing between said cutter and said leg,
a diaphragm mounted in said leg and exposed on one side to the pressure of lubricant in said reservoir and communicating means and on the other side to the external pressure,
said diaphragm having a puncture therethrough,
said diaphragm being of sufficient flexibility, thickness and having an effective flexing diameter to preselect the pressure differential at which said puncture opens to allow pressure relief therethrough,
said diaphragm being mounted in a vent passage defined through said leg,
a recess being defined in the exterior of said leg at the outer end of said vent passage,
a retainer mounted in said recess in engagement with said diaphragm to retain said diaphragm therein, and
an insert positioned in said recess and adapted to engage the inner side of the diaphragm in an annular area at its outer periphery,
said insert defining the effective free area of the diaphragm for relief into said lubrication system.

11. A drill bit according to claim 10, wherein
said insert defines an orifice communicating from said vent passage to the inner side of said diaphragm,
said orifice being of a size and length to prevent transmission of all of the transient pressure changes in said lubrication system.

* * * * *